United States Patent
Li (10) Patent No.: US 11,295,505 B2
(45) Date of Patent: Apr. 5, 2022

(54) ANIMATION GENERATION USING A TARGET ANIMATION MODEL AND ANIMATION STATE PARAMETERS

(71) Applicant: BEIJING XIAOMI MOBILE SOFTWARE CO., LTD., Beijing (CN)

(72) Inventor: Jiayan Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/000,118

(22) Filed: Aug. 21, 2020

(65) Prior Publication Data
US 2021/0304480 A1    Sep. 30, 2021

(30) Foreign Application Priority Data

Mar. 31, 2020  (CN) .......................... 202010245821.7

(51) Int. Cl.
*G06T 13/80*    (2011.01)
*G06T 13/00*    (2011.01)

(52) U.S. Cl.
CPC .............. *G06T 13/80* (2013.01); *G06T 13/00* (2013.01); *G06T 2213/08* (2013.01); *G06T 2213/12* (2013.01)

(58) Field of Classification Search
CPC . G06T 13/80; G06T 2213/08; G06T 2213/12; G06T 13/00; G06F 3/0481–04817; G06F 8/35
See application file for complete search history.

(56) References Cited

U.S. PATENT DOCUMENTS

| 2008/0055317 | A1 |   | 3/2008  | Abel et al.                    |
|--------------|----|---|---------|--------------------------------|
| 2014/0309870 | A1 | * | 10/2014 | Ricci ............. A61B 5/6808 701/36 |
| 2015/0116336 | A1 | * | 4/2015  | Yoshimura .......... G09G 5/006 345/520 |
| 2017/0357358 | A1 | * | 12/2017 | Teutschler ........ G06F 3/04883 |
| 2020/0066037 | A1 | * | 2/2020  | Hare ................ G06K 9/00261 |
| 2021/0097747 | A1 | * | 4/2021  | Sachter-Zeltzer ...... G06T 13/00 |

OTHER PUBLICATIONS

European Patent Office, Extended European Search Report Issued in Application No. 20193115.1 Nov. 2, 2020, Germany, 10 pages.

\* cited by examiner

*Primary Examiner* — Daniel F Hajnik
(74) *Attorney, Agent, or Firm* — Syncoda LLC; Feng Ma (57) ABSTRACT

A method of generating animation includes: determining a target element based on a received first instruction, setting a target state of the target element and/or detecting a target operation on the target element, and obtaining a current state animation parameter of the target element; obtaining a target animation model among pre-stored animation models; and generating animation of the target element based on the target animation model and an initial state animation parameter of the target animation model, where the current state animation parameter is taken as the initial state animation parameter.

17 Claims, 7 Drawing Sheets

Determine a target element based on a received first instruction, set a target state of the target element and/or detect a target operation on the target element, and obtain a current state animation parameter of the target element — S101

Obtain a target animation model among pre-stored animation models — S102

Generate animation of the target element based on the target animation model and an initial state animation parameter of the target animation model, where the current state animation parameter is taken as the initial state animation parameter — S103

ANIMATION GENERATION USING A TARGET ANIMATION MODEL AND ANIMATION STATE PARAMETERS

CROSS REFERENCE TO RELATED APPLICATIONS

This application claims priority to Chinese Patent Application No. 202010245821.7 filed on Mar. 31, 2020, the disclosure of which is hereby incorporated by reference in its entirety.

BACKGROUND

In a terminal such as a mobile phone, a user can operate an element such as an icon displayed on a display screen of the terminal. In order for the user to view the operation process, an animation may be generated for the element operated by the user.

SUMMARY

The present disclosure relates to the field of animation rendering, and in particular, to methods of generating animation, apparatuses for generating animation, and electronic devices.

According to a first aspect of examples of the present disclosure, there is provided a method of generating animation including: determining a target element based on a received first instruction, setting a target state of the target element and/or detecting a target operation on the target element, and obtaining a current state animation parameter of the target element; obtaining a target animation model among prestored animation models; and generating animation of the target element based on the target animation model and an initial state animation parameter of the target animation model, where the current state animation parameter is taken as the initial state animation parameter.

According to a second aspect of examples of the present disclosure, there is provided an apparatus for generating animation including: an element determination module configured to determine a target element based on a received first instruction, set a target state of the target element and/or detect a target operation on the target element, and obtain a current state animation parameter of the target element; a model obtaining module configured to obtain a target animation model among pre-stored animation models; and an animation generation module configured to generate animation of the target element based on the target animation model and an initial state animation parameter of the target animation model, where the current state animation parameter is taken as the initial state animation parameter.

According to a third aspect of examples of the present disclosure, there is provided an electronic device, including: one or more processors; a memory for storing instructions that are executable by the one or more processors to perform operations including: determining a target element based on a received first instruction, setting a target state of the target element and/or detecting a target operation on the target element, and obtaining a current state animation parameter of the target element; obtaining a target animation model among pre-stored animation models; and generating animation of the target element based on the target animation model and an initial state animation parameter of the target animation model, where the current state animation parameter is taken as the initial state animation parameter.

According to a fourth aspect of examples of the present disclosure, there is provided a computer-readable storage medium having computer program instructions stored thereon, wherein the computer program instructions are executable by a processor to perform operations including: determining a target element based on a received first instruction, setting a target state of the target element and/or detecting a target operation on the target element, and obtaining a current state animation parameter of the target element; obtaining a target animation model among pre-stored animation models; and generating animation of the target element based on the target animation model and an initial state animation parameter of the target animation model, where the current state animation parameter is taken as the initial state animation parameter.

It may be understood that the above general descriptions and the below detailed descriptions are merely exemplary and explanatory, and are not intended to limit the present disclosure.

BRIEF DESCRIPTION OF DRAWINGS

The accompanying drawings, which are incorporated in and constitute a part of this disclosure, illustrate examples consistent with the present disclosure and, together with the description, serve to explain the principles of the disclosure.

DETAILED DESCRIPTION

Examples will be described in detail herein, with the illustrations thereof represented in the drawings. When the following descriptions involve the drawings, like numerals in different drawings refer to like or similar elements unless otherwise indicated. The examples described in the following examples do not represent all examples consistent with the present disclosure. Rather, they are merely examples of apparatuses and methods consistent with some aspects of the present disclosure as detailed in the appended claims.

When generating animations, developers may be required to set respective functions to output change processes of respective factors based on the factors of the user's operation on the element, such as the direction, speed, and acceleration of the movement of the element, and then animation of the element may be produced based on the change processes outputted by the respective functions.

Setting a large number of functions may take up a lot of time of the developers. In addition, in order to produce animations, it may be necessary to integrate the change processes outputted by the respective functions, such that many resources of the terminal may be occupied.

Figure 1:
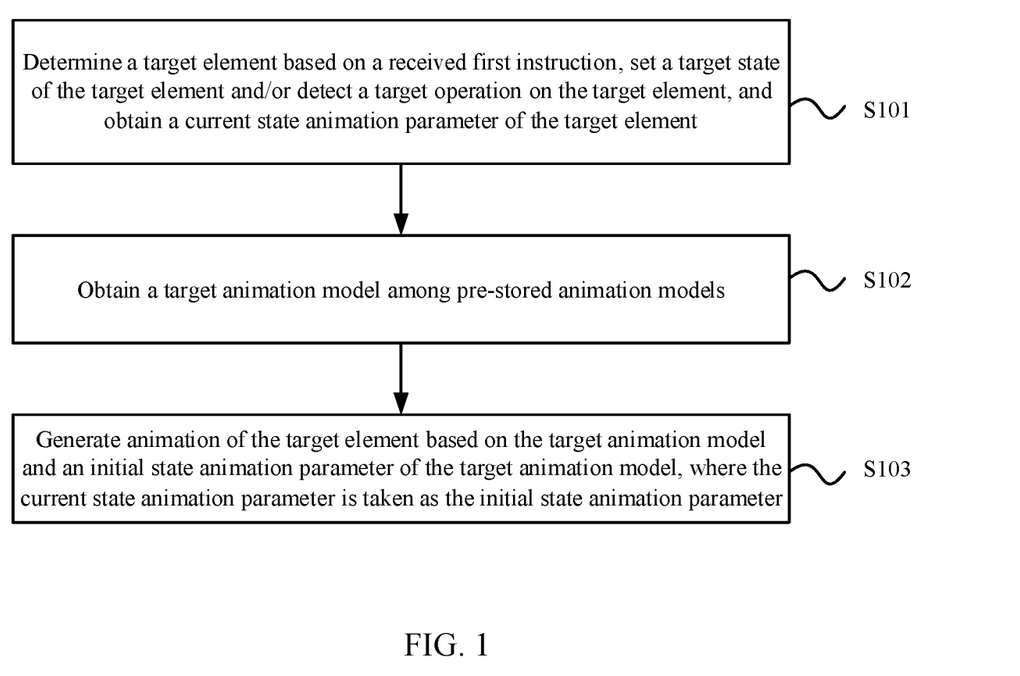
FIG. 1 is a schematic flowchart illustrating a method of generating animation according to some embodiments of the present disclosure.

FIG. 1 is a schematic flowchart illustrating a method of generating animation according to some embodiments of the present disclosure. The method shown in this example can be applied to a terminal, and the terminal includes but is not limited to a mobile phone, a tablet computer, a wearable device, and other electronic device.

As shown in FIG. 1, the method of generating animation may include steps S101 to S103.

At step S101, a target element is determined based on a received first instruction, a target state of the target element is set and/or a target operation on the target element is detected, and a current state animation parameter of the target element is obtained.

At step S102, a target animation model is obtained among pre-stored animation models.

At step S103, animation of the target element is generated based on the target animation model and an initial state animation parameter of the target animation model, where the current state animation parameter is taken as the initial state animation parameter.

In one example, the target element for animation generation can be determined by inputting the first instruction. The target element can be any element that can be displayed by the terminal, for example, the target element can be the entire interface of the terminal, or can be an icon of an application in the terminal.

Upon receiving the first instruction, the target state of the target element can be set and/or the target operation on the target element can be detected, and the current state animation parameter of the target element is obtained.

In one example, each time the target element moves in accordance with the generated animation, the target state animation parameter at the end of the animation movement of the target element can be recorded as a current state animation parameter at the beginning of the next movement of the target element. For example, the target state animation parameter at the end of a movement of the target element moving in accordance with the animation generated at the t-th time is taken as a current state animation parameter at the beginning of a movement of the target element moving in accordance with the animation generated at the (t+1)-th time.

The current state animation parameter and the target state animation parameter can include a plurality of animation parameters, such as a speed, acceleration, a direction, etc. of the movement of the target element, and can also include a position, a color, a transparency, etc. of the target element. The target operation on the target element includes, but is not limited to, click, long press, and default state (when the target element is not operated, the target element is configured with a specified animation model by default).

It should be noted that the target state refers to states of one or more animation parameters of the target element. Take the animation parameter being a position as an example, the target state can be that the target element is located in the lower right corner of the mobile phone screen; take the animation parameter being a transparency as an example, the target state can be that the target element has a 50% transparency. The target state animation parameter can include all animation parameters of the target element.

A plurality of animation models can be pre-stored in advance. In an example, an association relationship between the pre-stored animation models and states of respective elements and/or operations on respective elements can be established, and further, a target animation model associated with the target state and/or the target operation can be retrieved based on the association relationship. Then, animation of the target element is generated based on the target animation model and an initial state animation parameter of the target animation model, where the current state animation parameter is taken as the initial state animation parameter. In another example, the target animation model can be determined based on an instruction received by the terminal, which will be described below.

In one example, the animation model can be a multivariate function, for example, the function can integrate a plurality of physics (such as acceleration, gravity, gravity, friction, etc.) calculation models and a function of an animation interpolator.

The multivariate function includes, but is not limited to, a motion trajectory, a speed function, an acceleration function, a direction function, a color change function, and a transparency change function of the element for animation generation. The current state animation parameter can be inputted into the target animation model as the initial state animation parameter of the target animation model.

Based on different target states, different target animation models can be retrieved, take the animation model as a motion trajectory as an example.

For example, the target state of the target element is set as the target element being located in the lower right corner of the mobile phone screen. Based on the association relationship between the pre-stored animation models and states of respective elements, it is retrieved that the motion trajectory in the target animation model associated with the target state is a parabola, the current state animation parameter of the target element at this time is obtained, that is, the position of the target element being located in the upper left corner of the mobile phone screen. The current state animation parameter of the target element is taken as the initial state animation parameter of the target animation model, animation of the target element can be generated based on the target animation model and the initial state animation parameter, that is, the animation in which the target element moves from the upper left corner of the mobile phone screen to the lower right corner of the mobile phone screen along a parabolic trajectory.

For example, the target state of the target element is set as the target element being located in the middle of the right edge of the mobile phone screen, and based on the association relationship between the pre-stored animation models and states of respective elements, it is retrieved that the motion trajectory in the target animation model associated with the target state is a straight line, and the current state animation parameter of the target element at this time is obtained, that is, the position of the target element is located in the upper left corner of the mobile phone screen. The current state animation parameter is taken as the initial state animation parameter of the target animation model, animation of the target element can be generated based on the target animation model and the initial state animation parameter, that is, the animation in which the target element moves from the upper left corner of the mobile phone screen to the middle of the right edge of the mobile phone screen along a straight line.

Similarly, based on a target operation on the target element is detected, based on the association relationship between the pre-stored animation models and operations on the respective elements, the target animation model associated with the received target operation can be retrieved. The following description will be provided taking animation model being a color change as an example.

For example, it is detected that the target operation on the target element is a click, and based on the association relationship between the pre-stored animation models and operations on the respective elements, it is retrieved that the target animation model associated with the click is that the color of the target element becomes blue. The current state animation parameter of the target element at this time is obtained, that is, the color of the target element being white. The current state animation parameter is taken as the initial state animation parameter of the target animation model, based on the target animation model and the initial state animation parameter, animation of the target element is generated, that is, the animation in which the target element becomes blue from white can be generated.

For example, it is detected that the target operation on the target element is a long press, and based on the association relationship between the pre-stored animation models and operations on the respective elements, it is retrieved that the target animation model associated with the long press is that the color of the target element becomes red. The current state animation parameter of the target element at this time is obtained, that is, the color of the target element being white. The current state animation parameter is taken as the initial state animation parameter of the target animation model, based on the target animation model and the initial state animation parameter, animation of the target element is generated, that is, the animation in which the target element becomes red from white can be generated.

According to some embodiments of the present disclosure, based on the association relationship between the pre-stored animation models and states of respective elements and/or operations on the respective elements, after the target state is set and/or the target operation on the target element is detected, it is possible to retrieve a corresponding target animation model, and the current state animation parameter of the target element is obtained as the initial state animation parameter of the target animation model, and the animation of the target element is generated based on the target animation model and the initial state animation parameter.

As such, it is possible to generate animation for elements without setting functions separately for various factors of the element. It can save time, and there is no need to integrate the change process outputted by a plurality of functions. Animations can be generated based on the animation model, which can reduce occupation of terminal resources.

It should be noted that, in this example, generating the animation of the target element based on the target animation model can be generating data corresponding to the animation without implementing a specific rendering action. After the data corresponding to the animation is generated, a rendering action can be automatically performed based on the data, and a visible animation is generated.

Figure 2:
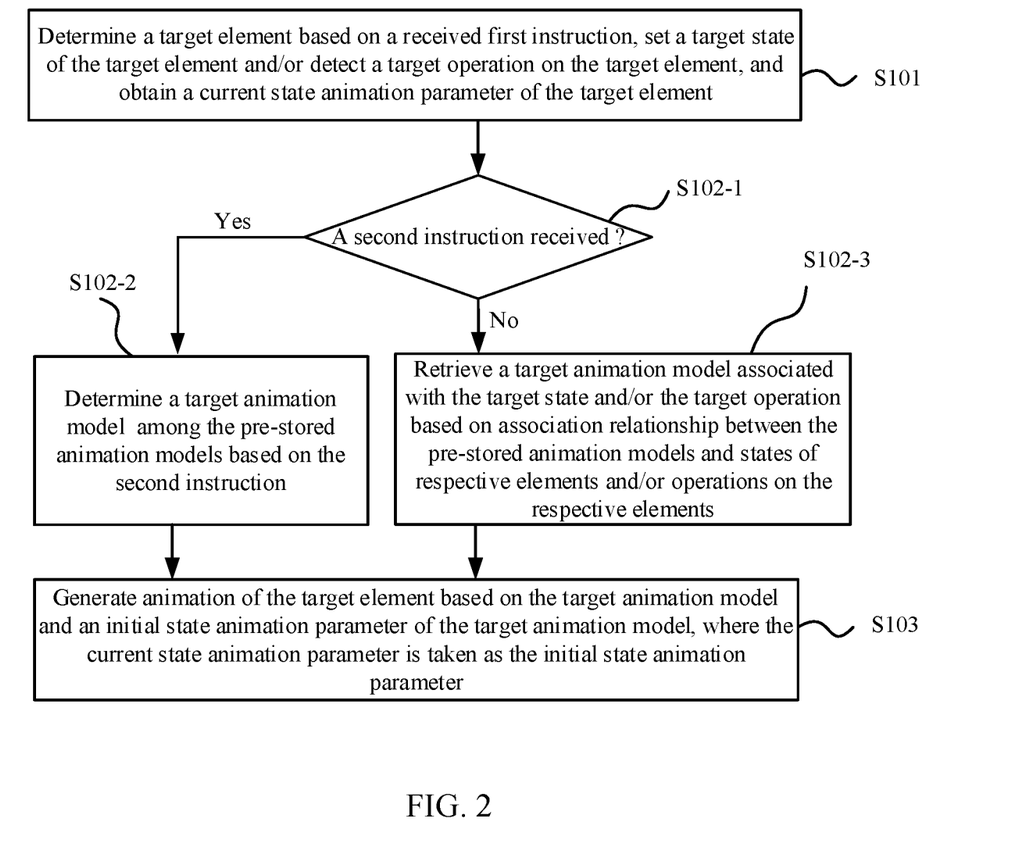
FIG. 2 is a schematic flowchart illustrating another method of generating animation according to some embodiments of the present disclosure.

FIG. 2 is a schematic flowchart illustrating another method of generating animation according to some embodiments of the present disclosure. As shown in FIG. 2, the obtaining of the target animation model among pre-stored animation models, includes Step S102-1 to Step S102-3.

At step S102-1, it is determined whether a second instruction is received.

When the second instruction is received, step S102-2 is performed, and the target animation model is determined among the pre-stored animation models based on the second instruction. When the second instruction is not received, step S102-3 is performed, and the target animation model associated with the target state and/or the target operation is retrieved based on association relationship between the pre-stored animation models and states of respective elements and/or operations on the respective elements.

In one example, based on the received second instruction, an animation model can be designated as the target animation model among the pre-stored animation models, and then the current state animation parameter can be used as the initial state animation parameter of the target animation model, the animation of the target element is generated based on the target animation model and the initial state animation parameter.

Accordingly, it is possible not to be limited to the retrieving of the target animation model at step S102-3, but to directly determine the target animation model. This is convenient for selecting the desired target animation model to generate animation, which is beneficial to improve the user experience.

Figure 3:
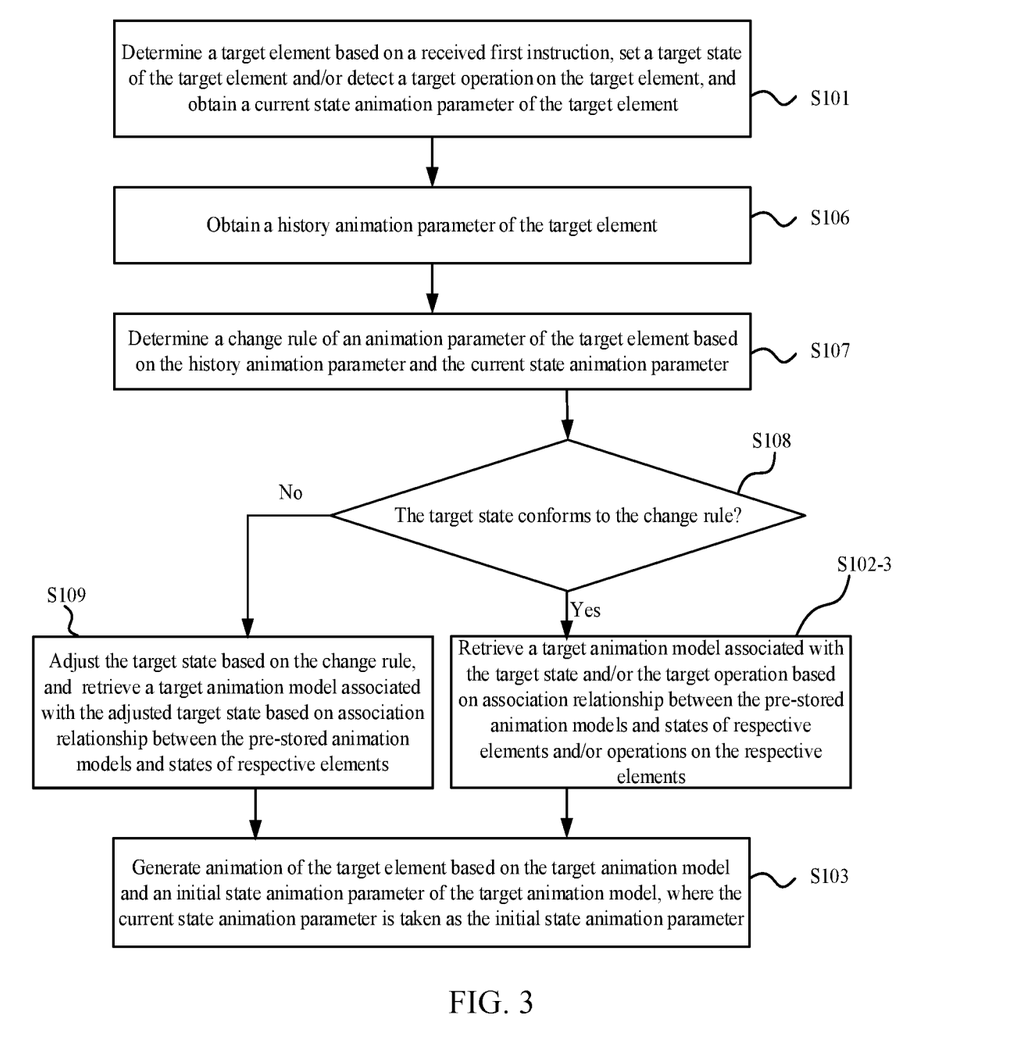
FIG. 3 is a schematic flowchart illustrating still another method of generating animation according to some embodiments of the present disclosure.

FIG. 3 is a schematic flowchart illustrating still another method of generating animation according to some embodiments of the present disclosure. As shown in FIG. 3, before the obtaining of the target animation model, the method further includes steps S106-S109.

At step S106, a history animation parameter of the target element is obtained.

At step S107, a change rule of an animation parameter of the target element is determined based on the history animation parameter and the current state animation parameter.

At step S108, it is determined whether the target state conforms to the change rule.

When the target state does not conform to the change rule, step S109 is performed, the target state is adjusted based on the change rule, and the target animation model associated with the adjusted target state is retrieved based on association relationship between the pre-stored animation models and states of respective elements.

When the target state conforms to the change rule, step S102-3 is performed, the target animation model associated with the target state and/or the target operation is retrieved based on the association relationship between the pre-stored animation models and states of respective elements and/or operations on the respective elements.

In one example, since the target state can be manually set, there can be unreasonable points to some degree. In order to determine whether the setting of the target state is reasonable, the change rule of the animation parameter of the target element can be determined based on the history animation parameter and the current state animation parameter of the target element first. The history animation parameters can be a plurality of animation parameters before the current state animation parameters.

In one example, the determined change rule of the animation parameter can be a comprehensive change rule of various animation parameters. For example, taking the position as an example, the change rule can be a parabola obtained by fitting positions in the history animation parameter and current state animation parameter.

When the position of the target element in the target state is a position deviated far from a parabola, when the animation is still generated based on the target state, the generated animation will be that the target element moves along the parabola, and then suddenly produces a polyline movement. This generally does not conform to the movement of the target element in the actual scene, so it can be determined that the target state does not conform to the change rule in this case, so that the target state can be adjusted based on the change rule, such as the position of the target element in the target state is adjusted to be on or near the parabola.

Accordingly, it is beneficial to ensure that the finally generated animation is relatively reasonable, and abnormal changes in the animation parameters at the end of the animation is avoided.

Figure 4:
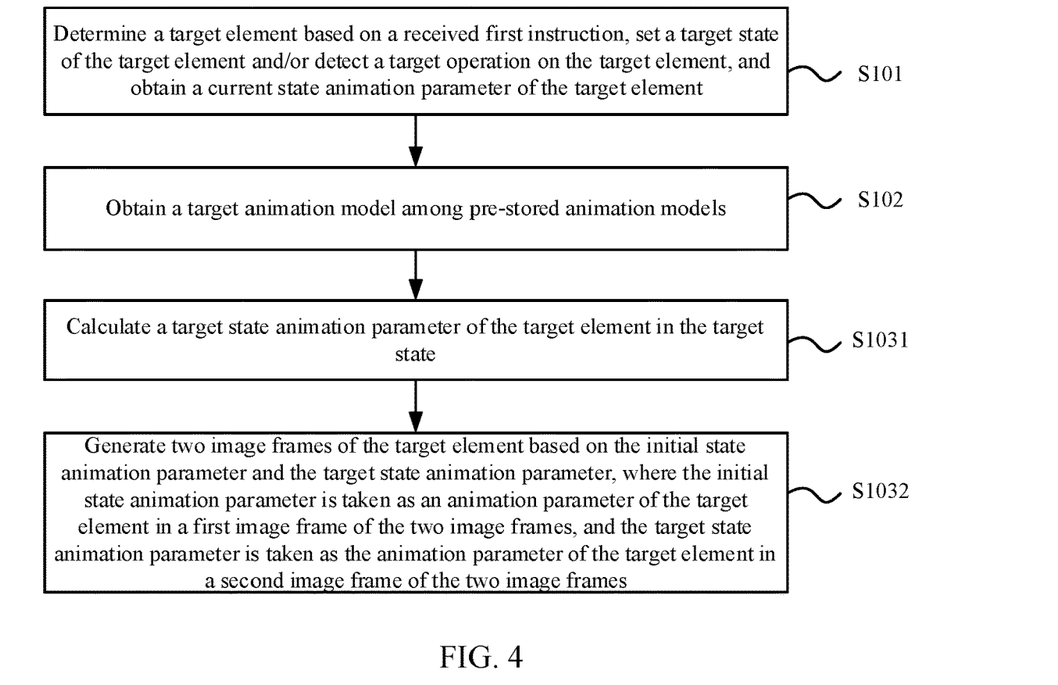
FIG. 4 is a schematic flowchart illustrating yet another method of generating animation according to some embodiments of the present disclosure.

FIG. 4 is a schematic flowchart illustrating still another method of generating animation according to some embodiments of the present disclosure. As shown in FIG. 4, the generating of the animation of the target element includes step S1031 and step S1032.

At step S1031, a target state animation parameter of the target element in the target state is calculated.

At step S1032, two image frames of the target element are generated based on the initial state animation parameter and the target state animation parameter, where the initial state animation parameter is taken as an animation parameter of the target element in a first image frame of the two image frames, and the target state animation parameter is taken as the animation parameter of the target element in a second image frame of the two image frames.

In one example, the animation of the target element can be displayed through merely two image frames, and the current state animation parameter can be used as the initial state animation parameter of the target animation model, and the target state animation parameter of the target element in the target state is calculated.

Since the set target state also includes one or more animation parameters, when the calculated target state animation parameters do not match the set target state, a difference between the set target state animation parameter and the calculated target state animation parameter can be calculated. When the difference is relatively large, a prompt message is generated, and when the difference is relatively small, the set target state animation parameter can be used.

For the generated two image frames, in the first image frame, the animation parameter of the target element is the initial state animation parameter, and in the second image frame, the animation parameter of the target element is the target state animation parameter. Therefore, the target element in the first image frame is shown as the current state animation parameter, and then in the second image frame, the target state animation parameter is suddenly presented. For example, the current state animation parameter and the target state animation parameter are both positions, then the display effect is the target element moves instantly.

Figure 5:
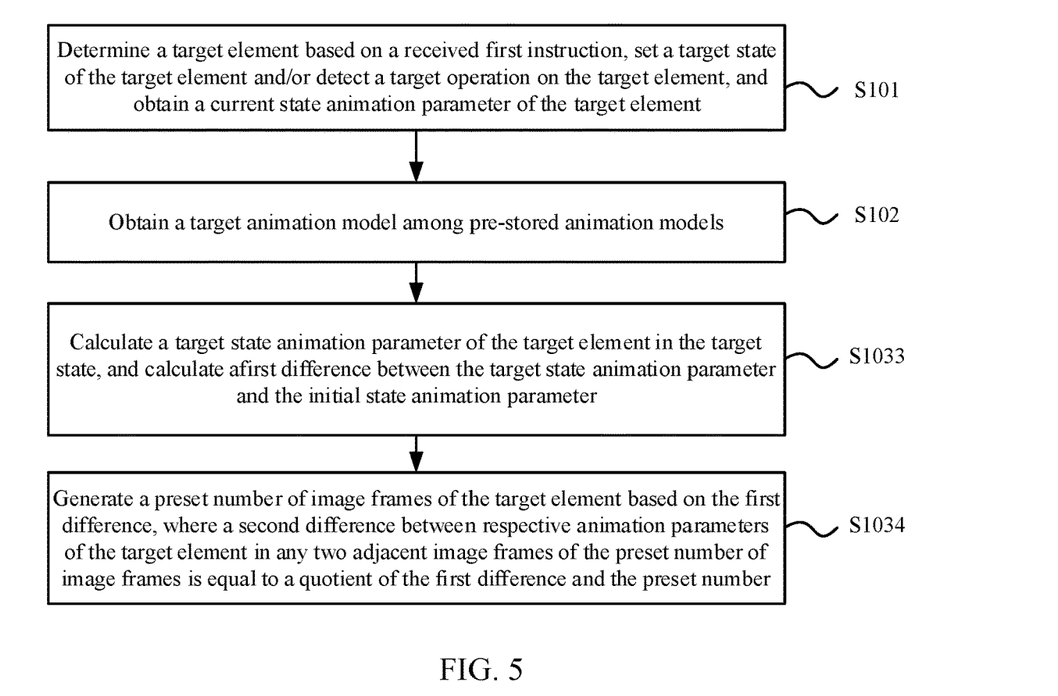
FIG. 5 is a schematic flowchart illustrating still another method of generating animation according to some embodiments of the present disclosure.

FIG. 5 is a schematic flowchart illustrating still another method of generating animation according to some embodiments of the present disclosure. As shown in FIG. 5, the generating of the animation of the target element includes steps S1033-S1034.

At step S1033, a target state animation parameter of the target element in the target state is calculated, and a first difference between the target state animation parameter and the initial state animation parameter is calculated.

At step S1034, a preset number of image frames of the target element are generated based on the first difference, where a second difference between respective animation parameters of the target element in any two adjacent image frames of the preset number of image frames is equal to a quotient of the first difference and the preset number.

In one example, the animation of the target element can be displayed through a plurality of image frames (more than two image frames). The current state animation parameters can be taken as the initial state animation parameter of the target animation model, the target state animation parameter of the target element in the target state can be calculated, and the first difference between the target state animation parameter and the initial state animation parameter can be calculated.

The preset number can be set according to needs, and is used to define how many image frames of the target element needs to express the change from the current state animation parameter to the target state animation parameter.

For the generated multiple image frames, the second difference between respective animation parameters of the target element in any two adjacent image frames of the preset number of image frames can be set as equal to the quotient of the first difference and the preset number. The following description will be provided by taking the animation parameter being position, the current state animation parameter being (1 cm, 0), the target state animation parameter being (5 cm, 0), and the preset number of image frames being 4 image frames, as an example.

Through calculation, it can be obtained that the first difference is 4 cm, and the quotient of the first difference and the preset number is 1 cm. Then animation of the target parameter moving from the position (1 cm, 0) to the position (5 cm, 0) can be displayed through 4 image frames, and between two adjacent image frames, the position of the target element is changed by 1 cm. Accordingly, the change of the target element in the animation composed of multiple image frames can be relatively uniform and coherent, thus ensuring an excellent visual effect.

Optionally, the animation model can also be associated with the current state animation parameter.

In one example, the animation model can be associated not only with the state of the element and/or the operation on the element, but also with the current state animation parameter of the element. That is, based on the association relationship between the pre-stored animation models and current state animation parameters of respective elements and/or states of respective elements and/or operations on respective elements, the target animation model associated with the current state animation parameter and/or the target state and/or the received target operation can be retrieved.

Corresponding to the above examples of the method of generating animation, the present disclosure also provides examples of an apparatus for generating animation.

Figure 6:
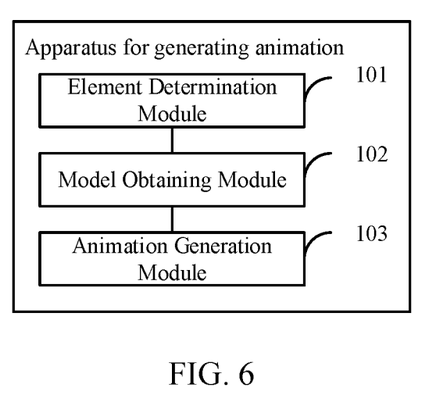
FIG. 6 is a schematic block diagram illustrating an apparatus for generating animation according to some embodiments of the present disclosure.

FIG. 6 is a schematic block diagram illustrating an apparatus for generating animation according to some embodiments of the present disclosure. The apparatus shown in this example is applicable to a terminal, and the terminal includes but is not limited to a mobile phone, a tablet computer, a wearable device, and other electronic device.

As shown in FIG. 6, the apparatus for generating animation can include an element determination module 101, a model obtaining module 102, and an animation generation module 103.

The element determination module 101 is configured to determine a target element based on a received first instruction, set a target state of the target element and/or detect a target operation on the target element, and obtain a current state animation parameter of the target element.

The model obtaining module 102 is configured to obtain a target animation model among pre-stored animation models.

The animation generation module 103 is configured to generate animation of the target element based on the target animation model and an initial state animation parameter of the target animation model, where the current state animation parameter is taken as an initial state animation parameter.

Figure 7:
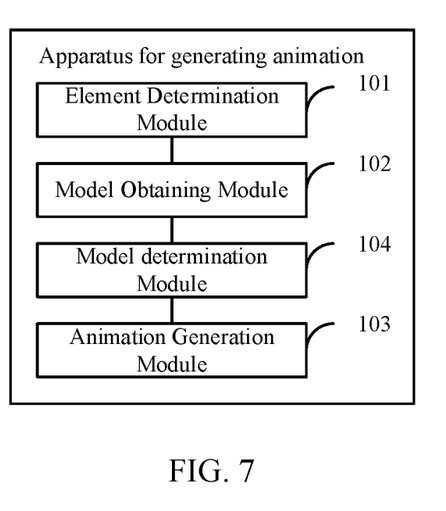
FIG. 7 is a schematic block diagram illustrating another apparatus for generating animation according to some embodiments of the present disclosure.

FIG. 7 is a schematic block diagram illustrating another apparatus for generating animation according to some embodiments of the present disclosure. As shown in FIG. 7, the apparatus further includes a model determination module 104.

The model determination module 104 is configured to, when a second instruction is received, determine the target animation model among the pre-stored animation models based on the second instruction, when the second instruction is not received, retrieve the target animation model associated with the target state and/or the target operation based on association relationship between the pre-stored animation models and states of respective elements and/or operations on the respective elements.

Figure 8:
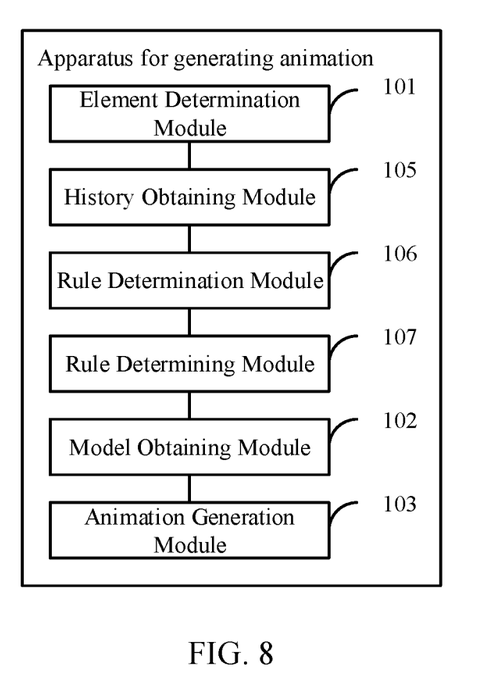
FIG. 8 is a schematic block diagram illustrating yet another apparatus for generating animation according to some embodiments of the present disclosure.

FIG. 8 is a schematic block diagram illustrating yet another apparatus for generating animation according to some embodiments of the present disclosure. As shown in FIG. 8, the apparatus further includes a history obtaining module 105, a rule determination module 106, and a rule determining module 107.

The history obtaining module 105 is configured to obtain a history animation parameter of the target element.

The rule determination module 106 is configured to determine a change rule of an animation parameter of the target element based on the history animation parameter and the current state animation parameter.

The rule determining module 107 is configured to determine whether the target state conforms to the change rule.

The model obtaining module 102 is configured to, when the target state does not conform to the change rule, adjust the target state based on the change rule, and retrieve the target animation model associated with the adjusted target state based on association relationship between the pre-stored animation models and states of respective elements; and when the target state conforms to the change rule, retrieve the target animation model associated with the target state and/or the target operation based on association relationship between the pre-stored animation models and states of respective elements and/or operations of respective elements.

Optionally, the animation generation module 103 further includes a calculation submodule and a first animation generation submodule. The calculation submodule is configured to calculate a target state animation parameter of the target element in the target state.

The first animation generation submodule is configured to generate two image frames of the target element based on the initial state animation parameter and the target state animation parameter, where the initial state animation parameter is taken as an animation parameter of the target element in a first image frame of the two image frames, and the target state animation parameter is taken as the animation parameter of the target element in a second image frame of the two image frames.

Optionally, the animation generation module 103 further includes a difference calculation submodule and a second animation generation submodule. The difference calculation submodule is configured to calculate a target state animation parameter of the target element in the target state, and calculate a first difference between the target state animation parameter and the initial state animation parameter. The second animation generation submodule is configured to generate a preset number of image frames of the target element based on the first difference, where a second difference between respective animation parameters of the target element in any two adjacent image frames of the preset number of image frames is equal to a quotient of the first difference and the preset number.

Optionally, each of the pre-stored animation models is also associated with the current state animation parameter.

Regarding to the apparatus in the above examples, the specific manner in which each module performs operations has been described in detail in the related method examples, which will not be elaborated here.

Since the apparatus examples substantially correspond to the method examples, a reference may be made to part of the descriptions of the method examples for the related part. The apparatus examples described above are merely illustrative, where the units described as separate members may be or not be physically separated, and the members displayed as units may be or not be physical units, e.g., may be located in one place, or may be distributed to a plurality of network units. Part or all of the modules may be selected according to actual requirements to implement the objectives of the solutions in the examples. Those of ordinary skill in the art may understand and carry out them without creative work.

Examples of the present disclosure also provides an electronic device, including:

a processor; a memory storing instructions executable by the processor; where the processor is configured to execute the instructions to implement the method described in any of the above examples.

Figure 9:
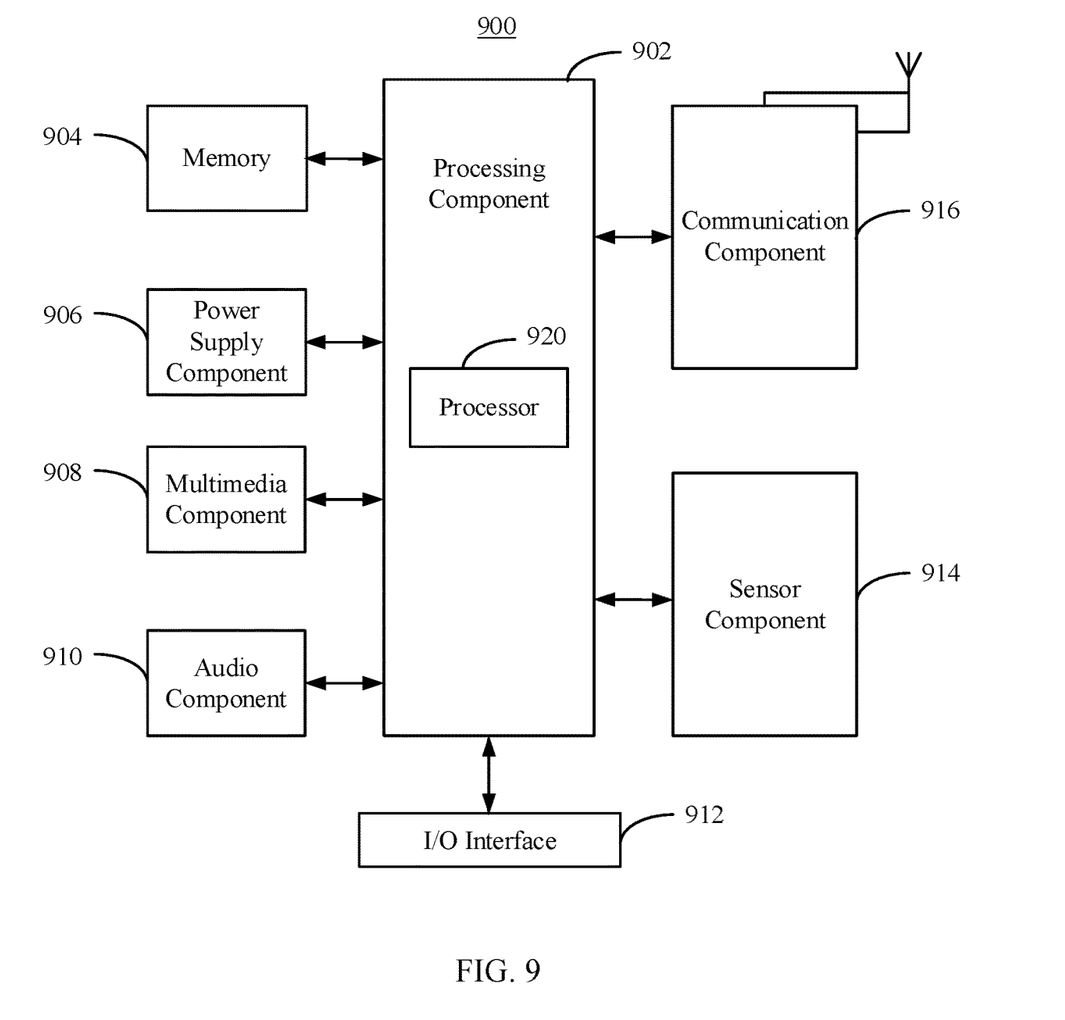
FIG. 9 is a schematic block diagram illustrating an electronic device according to some embodiments of the present disclosure.

FIG. 9 is a schematic block diagram illustrating an electronic device 900 according to some embodiments of the present disclosure. For example, the electronic device 900 can be a mobile phone, a computer, a digital broadcasting terminal, a messaging device, a game console, a tablet device, a medical device, fitness equipment, a personal digital assistant, or the like.

As shown in FIG. 9, the electronic device 900 can include one or more of the following components: a processing component 902, a memory 904, a power supply component 906, a multimedia component 908, an audio component 910, an input/output (I/O) interface 912, a sensor component 914, and a communication component 916. The electronic device 900 can also include the display panel according to any of the above examples.

The processing component 902 generally controls overall operations of the device 900, such as operations associated with display, phone calls, data communications, camera operations, and recording operations. The processing component 902 can include one or more processors 920 to execute instructions to complete all or part of the steps of the above methods. In addition, the processing component 902 can include one or more modules which facilitate the interaction between the processing component 902 and other components. For example, the processing component 902 can include a multimedia module to facilitate the interaction between the multimedia component 908 and the processing component 902.

The memory 904 is configured to store various types of data to support the operation of the device 900. Examples of such data include instructions for any application or method operated on the device 900, contact data, phonebook data, messages, pictures, videos, and so on. The memory 904 can be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 906 supplies power for different components of the device 900. The power supply component 906 can include a power supply management system, one or more power supplies, and other components associated with generating, managing, and distributing power for the device 900.

The multimedia component 908 includes a screen providing an output interface between the electronic device 900 and a user. In some examples, the screen can include a Liquid Crystal Display (LCD) and a Touch Panel (TP). In some embodiments, an organic light-emitting diode (OLED) display or other types of displays can be employed.

If the screen includes the TP, the screen can be implemented as a touch screen to receive input signals from the user. The TP can include one or more touch sensors to sense touches, swipes, and gestures on the TP. The touch sensors can not only sense a boundary of a touch or swipe, but also sense a duration and a pressure associated with the touch or swipe. In some examples, the multimedia component 908 can include a front camera and/or a rear camera. The front camera and/or rear camera can receive external multimedia data when the electronic device 900 is in an operating mode, such as a photographing mode or a video mode. Each of the front camera and the rear camera can be a fixed optical lens system or have focal length and optical zooming capability.

The audio component 912 is configured to output and/or input an audio signal. For example, the audio component 912 includes a microphone (MIC). When the electronic device 900 is in an operating mode, such as a call mode, a record mode and a voice recognition mode, the microphone is configured to receive an external audio signal. The received audio signal can be further stored in the memory 904 or sent via the communication component 916. In some examples, the audio component 912 further includes a speaker for outputting an audio signal.

The I/O interface 912 provides an interface between the processing component 902 and a peripheral interface module. The above peripheral interface module can be a keyboard, a click wheel, buttons, or the like. These buttons can include but not limited to, a home button, a volume button, a start button, and a lock button.

The sensor component 914 includes one or more sensors to provide animation parameter assessments of various aspects for the device 900. For example, the sensor component 914 can detect the on/off status of the device 900, and relative positioning of component, for example, the component is a display and a keypad of the device 900. The sensor component 914 can also detect a change in position of the electronic device 900 or a component of the device 900, an orientation or an acceleration/deceleration of the device 900, and a change in temperature of the device 900, whether a user being in contact with the device 900. The sensor component 914 can include a proximity sensor to detect the presence of a nearby object without any physical contact. The sensor component 914 can further include an optical sensor, such as a Complementary Metal-Oxide-Semiconductor (CMOS) or Charged Coupled Device (CCD) image sensor which is used in imaging applications. In some examples, the sensor component 914 can further include an acceleration sensor, a gyroscope sensor, a magnetic sensor, a pressure sensor, or a temperature sensor.

The communication component 916 is configured to facilitate wired or wireless communication between the electronic device 900 and other devices. The electronic device 900 can access a wireless network based on a communication standard, such as Wi-Fi, 2G, 3G, 4G, 5G, or a combination thereof. In an example, the communication component 916 receives a broadcast signal or broadcast related information from an external broadcast management system via a broadcast channel. In an example, the communication component 916 can further include a Near Field Communication (NFC) module for promoting short-range communication. For example, the NFC module can be implemented based on a radio frequency identification (RFID) technology, an infrared data association (IrDA) technology, an ultra-wideband (UWB) technology, a Bluetooth® (BT) technology and other technologies.

In an example, the electronic device 900 can be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components.

In an example, a non-transitory computer-readable storage medium including instructions is further provided, such as the memory 904 including instructions. The above instructions can be executed by the processor 920 of the electronic device 900 to implement the above method. For example, the non-transitory computer-readable storage medium can be a Read-Only Memory (ROM), a Random-Access Memory (RAM), a CD-ROM, a magnetic tape, a floppy disk, an optical data storage device, and so on.

Various embodiments of the present disclosure can have one or more of the following advantages.

After the target state is set and/or the target operation on the target element is detected, it is possible to obtain a target animation model among the pre-stored animation models, and animation of the target element is generated based on the target animation model and an initial state animation parameter of the target animation model, where the current state animation parameter of the target element is obtained as the initial state animation parameter of the target animation model. As such, it is possible to generate animation for elements without setting functions separately for various factors of the element. It can save time for developers, and there is no need to integrate the change process outputted by a plurality of functions. Animations can be generated only based on the target animation model, which can reduce occupation/consumption of terminal resources.

The terms "first" and "second" are used for descriptive purposes only and are not to be construed as indicating or implying a relative importance or implicitly indicating the number of technical features indicated. Thus, elements referred to as "first" and "second" can include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

It is to be understood that "multiple" mentioned in the present disclosure refers to two or more than two. "And/or" describes an association relationship of associated objects and represent that three relationships can exist. For example, A and/or B can represent three conditions, i.e., independent existence of A, coexistence of A and B and independent existence of B. Character "/" usually represents that previous and next associated objects form an "or" relationship.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a mark-up language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method of generating animation, comprising:
   determining a target element based on a received first instruction, setting a target state of the target element and/or detecting a target operation on the target element, and obtaining a current state animation parameter of the target element;
   obtaining a target animation model among pre-stored animation models; and
   generating animation of the target element based on the target animation model and an initial state animation parameter of the target animation model, wherein the current state animation parameter is taken as the initial state animation parameter;
   prior to the obtaining of the target animation model:
      obtaining a history animation parameter of the target element; wherein the history animation parameter includes a plurality of animation parameters before the current state animation parameter;
      determining a change rule of an animation parameter of the target element based on the history animation parameter and the current state animation parameter wherein the change rule is a parabola obtained by fitting a position in the history animation parameter and a position in the current state animation parameter; and
      determining whether the target state conforms to the change rule,
      wherein the obtaining of the target animation model comprises either of the following:
         in response to determining that the target state does not conform to the change rule, adjusting the target state based on the change rule, and retrieving the target animation model associated with the adjusted target state based on association relationship between the pre-stored animation models and states of respective elements; and
         in response to determining that the target state conforms to the change rule, retrieving the target animation model associated with the target state and/or the target operation based on association relationship between the pre-stored animation models and states of respective elements and/or operations on the respective elements.

2. The method according to claim 1, wherein the obtaining of the target animation model comprises:
   determining whether a second instruction is received; and obtaining the target animation model by either of the following:
in response to determining that the second instruction is not received, retrieving the target animation model associated with the target state and/or the target operation based on association relationship between the pre-stored animation models and states of respective elements and/or operations on the respective elements; and
in response to determining that the second instruction is received, determining the target animation model among the pre-stored animation models based on the second instruction.

3. The method according to claim 1, wherein the generating of the animation of the target element comprises:
calculating a target state animation parameter of the target element in the target state; and
generating two image frames of the target element based on the initial state animation parameter and the target state animation parameter, wherein the initial state animation parameter is taken as an animation parameter of the target element in a first image frame of the two image frames, and the target state animation parameter is taken as the animation parameter of the target element in a second image frame of the two image frames.

4. The method according to claim 1, wherein the generating of the animation of the target element comprises:
calculating a target state animation parameter of the target element in the target state, and calculating a first difference between the target state animation parameter and the initial state animation parameter; and
generating a preset number of image frames of the target element based on the first difference, wherein a second difference between respective animation parameters of the target element in any two adjacent image frames of the preset number of image frames is equal to a quotient of the first difference and the preset number.

5. The method according to claim 1, wherein each of the pre-stored animation models is further associated with the current state animation parameter.

6. A terminal implementing the method of claim 1, comprising a display screen configured to display the animation, wherein after the target state is set and/or the target operation on the target element is detected, the terminal is configured to obtain the target animation model among the pre-stored animation models, and generate animation of the target element based on the target animation model and the initial state animation parameter of the target animation model, wherein the current state animation parameter of the target element is obtained as the initial state animation parameter of the target animation model, to thereby facilitate the terminal generating animations for elements without setting a plurality of functions separately for various factors of the elements.

7. The terminal of claim 6, wherein the terminal is configured to generate the animations only based on the target animation model without integrating change processes outputted by the plurality of functions, thereby reducing resource consumption of the terminal.

8. An electronic device, comprising:
one or more processors; and
memory for storing instructions that are executable by the one or more processors to perform operations comprising:
determining a target element based on a received first instruction, setting a target state of the target element and/or detecting a target operation on the target element, and obtaining a current state animation parameter of the target element;
obtaining a target animation model among pre-stored animation models; and
generating animation of the target element based on the target animation model and an initial state animation parameter of the target animation model, wherein the current state animation parameter is taken as the initial state animation parameter;
prior to the obtaining of the target animation model:
obtaining a history animation parameter of the target element; wherein the history animation parameter includes a plurality of animation parameters before the current state animation parameter;
determining a change rule of an animation parameter of the target element based on the history animation parameter and the current state animation parameter wherein the change rule is a parabola obtained by fitting a position in the history animation parameter and a position in the current state animation parameter; and
determining whether the target state conforms to the change rule,
wherein the obtaining of the target animation model comprises either of the following:
in response to determining that the target state does not conform to the change rule, adjusting the target state based on the change rule, and retrieving the target animation model associated with the adjusted target state based on association relationship between the pre-stored animation models and states of respective elements; and
in response to determining that the target state conforms to the change rule, retrieving the target animation model associated with the target state and/or the target operation based on association relationship between the pre-stored animation models and states of respective elements and/or operations on the respective elements.

9. The electronic device according to claim 8, wherein the obtaining of the target animation model comprises:
determining whether a second instruction is received; and
obtaining the target animation model by either of the following:
in response to determining that the second instruction is not received, retrieving the target animation model associated with the target state and/or the target operation based on association relationship between the pre-stored animation models and states of respective elements and/or operations on the respective elements; and
in response to determining that the second instruction is received, determining the target animation model among the pre-stored animation models based on the second instruction.

10. The electronic device according to claim 8, wherein the generating of the animation of the target element comprises:
calculating a target state animation parameter of the target element in the target state; and
generating two image frames of the target element based on the initial state animation parameter and the target state animation parameter, wherein the initial state animation parameter is taken as an animation parameter of the target element in a first image frame of the two image frames, and the target state animation parameter is taken as the animation parameter of the target element in a second image frame of the two image frames.

11. The electronic device according to claim 8, wherein the generating of the animation of the target element comprises:
calculating a target state animation parameter of the target element in the target state, and calculating a first difference between the target state animation parameter and the initial state animation parameter; and
generating a preset number of image frames of the target element based on the first difference, wherein a second difference between respective animation parameters of the target element in any two adjacent image frames of the preset number of image frames is equal to a quotient of the first difference and the preset number.

12. The electronic device according to claim 8, wherein each of the pre-stored animation models is further associated with the current state animation parameter.

13. A non-transitory computer-readable storage medium having computer program instructions stored thereon, wherein the computer program instructions are executable by a processor to perform operations comprising:
determining a target element based on a received first instruction, setting a target state of the target element and/or detecting a target operation on the target element, and obtaining a current state animation parameter of the target element;
obtaining a target animation model among pre-stored animation models; and generating animation of the target element based on the target animation model and an initial state animation parameter of the target animation model, wherein the current state animation parameter is taken as the initial state animation parameter;
prior to the obtaining of the target animation model:
obtaining a history animation parameter of the target element; wherein the history animation parameter includes a plurality of animation parameters before the current state animation parameter;
determining a change rule of an animation parameter of the target element based on the history animation parameter and the current state animation parameter, wherein the change rule is a parabola obtained by fitting a position in the history animation parameter and a position in the current state animation parameter; and
determining whether the target state conforms to the change rule,
wherein the obtaining of the target animation model comprises either of the following:
in response to determining that the target state does not conform to the change rule, adjusting the target state based on the change rule, and retrieving the target animation model associated with the adjusted target state based on association relationship between the pre-stored animation models and states of respective elements; and
in response to determining that the target state conforms to the change rule, retrieving the target animation model associated with the target state and/or the target operation based on association relationship between the pre-stored animation models and states of respective elements and/or operations on the respective elements.

14. The non-transitory computer-readable storage medium according to claim 13, wherein the obtaining of the target animation model comprises:
determining whether a second instruction is received; and
obtaining the target animation model by either of the following:
in response to determining that the second instruction is not received, retrieving the target animation model associated with the target state and/or the target operation based on association relationship between the pre-stored animation models and states of respective elements and/or operations on the respective elements; and
in response to determining that the second instruction is received, determining the target animation model among the pre-stored animation models based on the second instruction.

15. The non-transitory computer-readable storage medium according to claim 13, wherein the generating of the animation of the target element comprises:
calculating a target state animation parameter of the target element in the target state; and
generating two image frames of the target element based on the initial state animation parameter and the target state animation parameter, wherein the initial state animation parameter is taken as an animation parameter of the target element in a first image frame of the two image frames, and the target state animation parameter is taken as the animation parameter of the target element in a second image frame of the two image frames.

16. The non-transitory computer-readable storage medium according to claim 13, wherein the generating of the animation of the target element comprises:
calculating a target state animation parameter of the target element in the target state, and calculating a first difference between the target state animation parameter and the initial state animation parameter; and
generating a preset number of image frames of the target element based on the first difference, wherein a second difference between respective animation parameters of the target element in any two adjacent image frames of the preset number of image frames is equal to a quotient of the first difference and the preset number.

17. The non-transitory computer-readable storage medium according to claim 13, wherein each of the pre-stored animation models is further associated with the current state animation parameter.

* * * * *